United States Patent Office 3,387,148
Patented June 4, 1968

3,387,148
CONVERTER FUEL ELEMENT FOR NUCLEAR
REACTORS AND METHOD OF PRODUCING
THE SAME
Karl Janner, Erlangen, and Otto Olbrich, Munich, Germany, assignors to Siemens Aktiengesellschaft, Erlangen, Germany, a corporation of Germany
Filed Oct. 22, 1965, Ser. No. 510,437
Claims priority, application Germany, Nov. 26, 1964,
S 94,336
10 Claims. (Cl. 310—4)

ABSTRACT OF THE DISCLOSURE

A converter fuel element for a nuclear reactor includes a plurality of serially connected thermionic diodes, each having an annular emitter electrode and nuclear fuel for the reactor carried by the electrode. The electrode defines a hollow space surrounding the nuclear fuel and having a volume greater than any expanded volume of the nuclear reactor resulting from burn-up of the nuclear fuel in the reactor, whereby stresses produced by the volume increase of the fuel are absorbable in the space for maintaining the dimensional stability of the peripheral surface of the annular emitter electrode. A wave-shaped metal foil or metallic wool can be received in the space.

---

Our invention relates to converter fuel element for nuclear reactors and method of producing the same.

Thermionic diodes have been utilized for the direct conversion of heat into electrical energy and are already in an advanced experimental stage. With the aid of such thermionic diodes, efforts are also being made to raise the efficiency of nuclear reactors wherein the production of energy is still always exclusively directed to a vaporization process. The direct conversion of reactor heat into electric current with the aid of so-called converter fuel elements is of particularly great interest for supplying energy in space vehicles. The so-called reactor converter fuel elements are comprised accordingly of two components, namely the fissionable fuel material which produces the heat and the thermionic diodes built around the fuel and connected in series so as to increase the voltage output. With the fuel elements of the known state of the art, however, there is a disadvantage in that, due to the expansion of the fissionable material during an increasing burn-up, a corresponding distortion of the diode emitter surface takes place so that the accurate spacing between emitter and collector of the thermionic diode suffers thereby, causing possible short circuits under certain conditions. This danger is particularly great for reactor converters with a clearance or spacing between the diode electrodes in the order of magnitude of 0.1 mm. Such a small spacing is most desirable in order to achieve a large power density and an efficiency which is as great as possible.

It is accordingly an object of our invention to provide a converter fuel element and method of producing the same which avoids to a great extent the foregoing disadvantages of the heretofore known devices of this type.

With the foregoing and other objects in view, we provide a converter fuel element for nuclear reactors comprising series connected thermionic diodes wherein the nuclear fuel is connected with the emitter electrodes. To ensure the dimensional stability of the external emitter surfaces and thereby of the spacing between emitter and collector electrodes, hollow spaces are provided for absorbing with minimal stress the expansion of the nuclear fuel that is to be expected with increasing burn-up.

In accordance with another aspect of our invention, we provide in a method of producing a converter fuel element, the steps of embedding in a metal member at least one island of a ceramic nuclear fuel having a greater coefficient of expansion than the metal, heating the metal member to a temperature at which the nuclear fuel expands more greatly than the metal, and cooling the metal member so that the nuclear fuel contracts and the metal remains plastically deformed, whereby a hollow space remains around the island of the nuclear fuel.

The novel features which are considered as characteristic for the invention are set forth in particular in the appended claims.

While the invention has been illustrated and described herein as converter fuel element for nuclear reactors and method of producing the same, it is not intended to be limited to the details shown, since various modifications and structural changes may be made therein without departing in any way from the spirit of our invention and within the meaning and range of equivalents of the claims herein.

The invention itself, however, both as to its construction and its method of operation, together with additional objects and advantages thereof, will be best understood from the following description of specific embodiments when read in connection with the accompanying drawings, in which.

Figure 1:
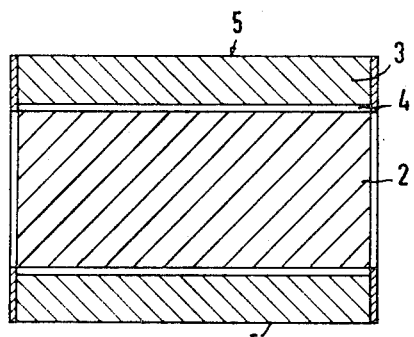
FIG. 1 is a longitudinal sectional view of a portion of a converter fuel element showing, for the sake of clarity, only the cylindrical emitter body thereof constructed in accordance with the invention.
Figure 2:
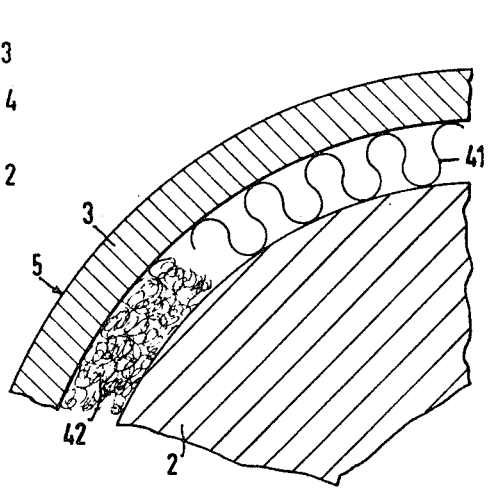
FIG. 2 is an enlarged fragmentary transverse sectional view of one embodiment of FIG. 1.

Referring now to the drawings and first particularly to FIG. 1 thereof, there is shown a cylindrical emitter body 3 in the interior of which the fissionable fuel material 2 is located. A small spacing or clearance 4 is provided between the fissionable material 2 and the emitter body 3 which permits expansion of the fissionable material body 2 without impairing the accuracy and dimensional stability of the emitter body 3 proper, and especially that of its surface 5. It is consequently expedient to fill this hollow space 4, as shown in FIG. 2, with a flexible or elastic material affording a trouble-free heat contact and heat transfer between the fissionable material 2 and the emitter body 3 proper. This can be achieved, for example, by providing a wave-shaped metal foil 41 in the hollow space 4 or by filling the space 4 with a fibrous mass or wool of highly heat-resistant materials, such as molybdenum, or any combination of such filling materials. Before or during operation of the reactor, the points of engagement between the fuel 2 and the foil 41 on the one hand and the emitter body 3 and foil 41 on the other hand are welded to one another so that the heat transfer therebetween is even further increased thereby. The same is true for the woolen-like filling material 42, whereby the fibers are also welded to the fuel 2 and emitter body 3, so that a constant improvement in the heat transfer characteristics and the electrical conductivity may be expected while simultaneousuly maintaining the elasticity of the filling material.

Figure 3:
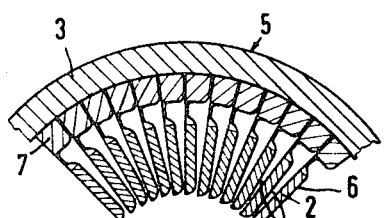
FIG. 3 is a fragmentary enlarged transverse sectional view of another embodiment of FIG. 1.

A modification based upon the principle of the invention in this application is shown in FIG. 3. The emitter body 3 proper is shown as a tube, in the interior of which, the fissionable material is located in a segment-like arrangement of pockets 6. These pockets are connected in good heat-conducting relationship by the tensioning bodies 7 with the tubular emitter body 3. An expansion space 4 is again located therebetween. The material of the pockets 6 suitably consists of a highly heat-resistant material such as molybdenum, for example.

Figure 4:
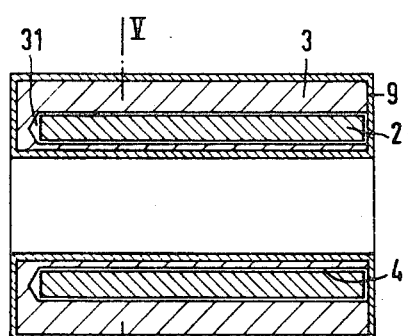
FIG. 4 is a longitudinal sectional view of a modified form of the cylindrical emitter body of FIG. 1.
Figure 5:
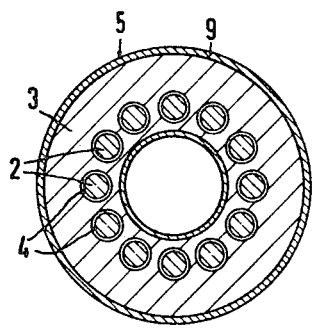
FIG. 5 is a cross-sectional view taken along the line V—V in FIG. 4.

A further possible modification is shown in FIGS. 4 and 5 of which FIG. 5 is a cross-sectional view taken along the line V—V of the longitudinal section of FIG. 4. In accordance with the embodiment of the invention shown in FIGS. 4 and 5, bores 31 are formed in the thick-walled tubular emitter body 3 so that they extend in the axial direction thereof, and the fissionable material 2, for example in tablet or rod form, is inserted in the bores 31. The diameter of the rods 2 of fissionable material is of such size that a small expansion space 4 remains within the bores 31 and thereby safely prevents transfer of stresses to the emitter body 3 from the fuel rod 2 as it expands with increasing burn-up. Due to the large surfaces of the fissionable material bodies, a heat-conductive direct connection to the emitter body can be omitted. Of course, such a connection should be employed or is advisable, however, when thick columns of fissionable material are to be used, since heat removal by radiation alone in such a case would no longer be suitable due to the danger of overheating in the interior.

Figure 6:
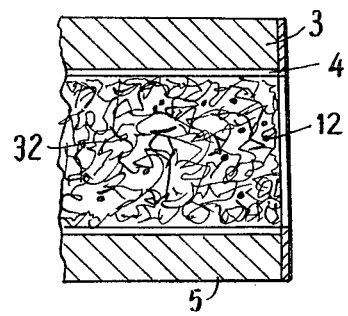
FIG. 6 is a fragmentary view corresponding to FIG. 1 showing a modification thereof.

A further modification applying the principle of our invention is shown in FIG. 6 and consists in that the fissionable material 2, for example of FIG. 1 or FIG. 4, is replaced by a wool 32 of highly heat-resistant material such as molybdenum with particles 12 of fissionable material uniformly dispersed therein. In such a case there is again afforded a suitable opportunity for the particles of fissionable material to expand, with simultaneous good heat conduction between the fissionable fuel and the emitter body 3 proper. For controlling the work function as well as diffusion barrier with respect to uranium and for reducing the vaporization rate, the emitter body 3 can be coated with another material 9, preferably tungsten (FIG. 5).

It is, however, also possible to construct the emitter body proper as a type of compound material between fissionable material and emitter structural material and to employ a so-called cermet for this purpose. Such a cermet consists for example of a base metal such as molybdenum, for example, in which ceramic particles such as uranium dioxide, for example, in the form of small, somewhat spherical islands of fissionable material are embedded. According to our method, we select ceramic particles having a thermal coefficient of expansion in the range above the operating temperature that is greater than that of the base material, so that an empty space can be produced around the individual grains by heating to produce a transitory temperature increase before completing the manufacture of the emitter body, which causes the base material to be plastically deformed thereby. For a molybdenum-uranium dioxide system at a temperature increase of about 700° C. above the operating temperature of 1700° C., the formation of an empty volume or space of about 1.5% of the volume of $UO_2$ is to be anticipated. If the melting point of the fuel is below that of the metal, for example for a uranium dioxide-tungsten system, the volume increase of the fissionable material at melting can also be utilized. The hollow spaces or empty volume produced in this manner for stress removal of the emitter body proper can be increased further by mixing the uranium dioxide with an oxide of lower melting point which has a greater volume increase when melting. For example, $Al_2O_3$ (melting point 2050° C., volume increase 15.3 cm.$^3$ per gram-mol) and the cermet formed therewith is heated to a temperature above the melting point of the ceramic components. Of course, other effects of the volume increase can also be utilized for this purpose, such as for example the phase change which occurs for beryllium oxide substantially at 2100° C. In such case, the beryllium oxide should be mixed with the uranium oxide.

The body 2 of fissionable material in the various embodiments illustrated and described herein can obviously also consist of a cermet of this type, and also, of course, of other suitable fuel materials such as, for example, pure uranium dioxide or uranium carbide, or mixtures thereof. Under certain conditions, metallic uranium can also be provided if one is concerned with the tight sealing of the chambers while retaining the corresponding hollow spaces. The latter possibility can particularly be applied in the embodiments of FIGS. 4 and 5.

These embodiments are not considered to be all-inclusive, other structural forms which are especially adapted also to the particular construction of the thermionic diodes as well as their holders and other structural requirements being clearly suggestible to the skilled artisan from a study of the disclosure herein.

We claim:

1. In a converter fuel element for a nuclear reactor, a plurality of serially connected thermionic diodes comprising respective annular emitter electrodes and nuclear fuel for the reactor carried by said electrodes, each of said annular emitter electrodes defining a hollow space surrounding said nuclear fuel, said hollow space having a volume greater than any expanded volume of the nuclear fuel resulting from burn-up thereof in the nuclear reactor, whereby stresses produced by the volume increase of the fuel are absorbable in said space for maintaining the dimensional stability of the peripheral surface of said annular emitter electrode.

2. In a converter fuel element for a nuclear reactor, a plurality of serially connected thermionic diodes comprising respective annular emitter electrodes and nuclear fuel for the reactor carried by said electrodes, each of said annular emitter electrodes defining a hollow space surrounding said nuclear fuel, said hollow space having a volume greater than any expanded volume of the nuclear fuel resulting from burn-up thereof in the nuclear reactor, whereby stresses produced by the volume increase of the fuel are absorbable in said space for maintaining the dimensional stability of the peripheral surface of said annular emitter electrode, the nuclear fuel being located in the interior space of said annular emitter electrode spaced from the inner surface thereof, and a wave-shaped metal foil being located between the fuel and the inner surface of said emitter electrode.

3. In a converter fuel element for a nuclear reactor, a plurality of serially connected thermionic diodes comprising respective annular emitter electrodes and nuclear fuel for the reactor carried by said electrodes, each of said annular emitter electrodes defining a hollow space surrounding said nuclear fuel, said hollow space having a volume greater than any expanded volume of the nuclear fuel resulting from burn-up thereof in the nuclear reactor, whereby stresses produced by the volume increase of the fuel are absorbable in said space for maintaining the dimensional stability of the peripheral surface of said annular emitter electrode, the nuclear fuel being located in said annular emitter electrode, radially spaced from the inner surface of said electrode, and metallic wool being received in the space between the nuclear fuel and the inner surface of said emitter electrode.

4. Converter fuel element according to claim 3 wherein said metallic wool consists of molybdenum.

5. In a converter fuel element for a nuclear reactor, a plurality of serially connected thermionic diodes comprising respective annular emitter electrodes and nuclear fuel for the reactor carried by said electrodes, each of said annular emitter electrodes defining a hollow space surrounding said nuclear fuel, said hollow space having a volume greater than any expanded volume of the nuclear fuel resulting from burn-up thereof in the nuclear reactor, whereby stresses produced by the volume increase of the fuel are absorbable in said space for maintaining the dimensional stability of the peripheral surface of said annular emitter electrode, the inner space of said annular emitter electrode being filled with a wool of high heat-resistant material and the nuclear fuel being distributed substantially uniformly in said wool.

6. Converter fuel element according to claim 5 wherein said material is molybdenum.

7. Converter fuel element according to claim 1, wherein a metal member is located in the interior space of said annular emitter electrode, the nuclear fuel is a ceramic and has a greater coefficient of expansion than the metal of said member, the fuel being stored in a hollow space in said metal member.

8. In a converter fuel element for a nuclear reactor, a plurality of serially connected thermionic diodes comprising respective annular emitter electrodes and nuclear fuel for the reactor carried by said electrodes, each of said annular emitter electrodes defining a hollow space surrounding said nuclear fuel, said hollow space having a volume greater than any expanded volume of the nuclear fuel resulting from burn-up thereof in the nuclear reactor, whereby stresses produced by the volume increase of the fuel are absorbable in said space for maintaining the dimensional stability of the peripheral surface of said annular emitter electrode, the nuclear fuel comprising a plurality of relatively narrow segments spaced from one another for free expansion, said fuel segments being clad with a layer of heat- and electrically-conductive material and connected thereby in the interior of said annular emitter electrode with the inner surface of said electrode.

9. Converter fuel element according to claim 1 wherein the annulus of said annular emitter electrode is formed with a plurality of hollow spaces and the nuclear fuel is loosely embedded in said hollow spaces.

10. Method of producing a thermionic diode of a converter fuel element for a nuclear reactor which comprises the steps of embedding in a metal member at least one island of a ceramic nuclear fuel having a greater coefficient of expansion than that of the metal, heating the metal member to a temperature at which the nuclear fuel has a greater rate of expansion than that of the metal, and cooling the metal member to a temperature at which the nuclear fuel is in a state of contraction and the metal is in a state of plastic deformation, whereby a hollow space is maintained around the island of the nuclear fuel.

References Cited

UNITED STATES PATENTS

| 2,848,800 | 8/1958 | Maloney et al. | 29—447 |
| 3,100,742 | 8/1963 | McGeary et al. | 29—400 X |
| 3,201,619 | 8/1965 | Gleason et al. | 176—68 X |
| 3,211,930 | 10/1965 | Clement et al. | 176—68 X |
| 3,232,717 | 2/1966 | Hill et al. | 310—4 X |
| 3,244,599 | 4/1966 | Hildebrand | 176—90 X |
| 3,265,910 | 8/1966 | Thomas | 176—39 X |

CARL D. QUARFORTH, *Primary Examiner.*

M. J. SCOLNICK, *Assistant Examiner.*